United States Patent [19]

Schlachter

[11] Patent Number: 4,938,519
[45] Date of Patent: Jul. 3, 1990

[54] SECURITY ENCLOSURE FOR OPEN DECK VEHICLE

[76] Inventor: Bradley S. Schlachter, P.O. Box 12168, Dallas, Tex. 75225

[21] Appl. No.: 461,978
[22] Filed: Jan. 8, 1990
[51] Int. Cl.⁵ .............................................. B60R 5/04
[52] U.S. Cl. .................................. 296/37.6; 224/42.42
[58] Field of Search ................... 296/37.6, 37.16, 24.1; 224/42.42

[56] References Cited

U.S. PATENT DOCUMENTS

| | | | |
|---|---|---|---|
| 4,127,301 | 11/1978 | Syrowik | 296/37.16 |
| 4,262,955 | 4/1981 | Duda | 296/24 |
| 4,413,854 | 11/1983 | Hirshberg | 296/146 |
| 4,451,075 | 5/1984 | Canfield | 296/37.6 |
| 4,480,675 | 11/1984 | Berkemeier | 160/121 |
| 4,506,870 | 3/1985 | Penn | 296/37.6 |
| 4,632,446 | 12/1986 | Douglass | 296/37.6 |
| 4,674,782 | 6/1987 | Helber | 293/106 |
| 4,733,898 | 3/1988 | Williams | 296/24 R |
| 4,749,226 | 6/1988 | Heft | 296/37.6 |
| 4,752,096 | 6/1988 | Ishikawa | 296/37.16 |
| 4,776,625 | 10/1988 | Lobanoff et al. | 296/37.16 |
| 4,828,312 | 5/1989 | Kinkle et al. | 296/37.6 |

Primary Examiner—Robert R. Song
Attorney, Agent, or Firm—Dennis T. Griggs

[57] ABSTRACT

A security enclosure is mounted onto the open load deck of a jeep between the rear seat and the tailgate. The load deck, deck sidewalls and tailgate provide four sidewalls of the security compartment. The top and forward sidewalls of the security enclosure are provided by top and forward panels which are stabilized by side flanges which are adapted for flush engagement against the load deck side panels. The top panel has a notch formed along the rear edge thereof for receiving the latch housing of the tailgate door which permits closure and locking of the tailgate. According to this arrangement, access to the security compartment is controlled by normal operation of the tailgate and its lock.

2 Claims, 2 Drawing Sheets

SECURITY ENCLOSURE FOR OPEN DECK VEHICLE

FIELD OF THE INVENTION

This invention relates generally to security enclosures which are adapted for use in combination with the load bed of an open deck vehicle such as a jeep or pickup truck.

BACKGROUND OF THE INVENTION

The cargo-carrying area of an open deck vehicle such as a jeep or pickup truck is commonly referred to as the load bed. Cargo space for tools, luggage, portable radios, portable telephones, cassette tapes, tape decks and other valuables may not be fully utilized because of the risk of unauthorized use or theft of such portable property which is carried in plain view on the load bed.

Engineers, contractors, technicians and skilled tradesmen perform on-site construction and use pickup trucks and jeeps to transport documents, tools and other portable items to construction sites. Such personal property must be off-loaded and secured, or alternatively, left unguarded on the open deck of the vehicle.

DESCRIPTION OF THE PRIOR ART

It is known to provide storage enclosures for securing portable property such as tools and equipment onto the load bed of an open deck vehicle. Such storage units are mounted onto or along the sidewalls of the open deck. Presently, conventional storage enclosures are approximately the size and shape of a steamer trunk and are installed at a forward location on the load bed just behind the cab.

Many contractors and craftsmen, finding such security enclosures to be inadequate, have adapted camper shells and canopies for attachment to the load bed sidewalls for securing portable equipment and tools. Others have attempted to secure their valuables by a slideable tonneau cover which attaches onto the sidewalls of the load bed. Some limitations of the commercially available security enclosures are as follows:

Conventional tool boxes when mounted onto the load bed of a pickup or jeep are conspicuous and accessible to unauthorized persons; the locking system for such security enclosures is easily snapped open with a pry bar; such security enclosures can easily be removed if not bolted to the body of the pickup truck; the presence of a security enclosure such as a tool box which extends across the load bed interferes with the placement and mounting of portable covering enclosures such as a canopy, camper shell and the like; such secure storage units usually have a lock which requires a separate key for opening, and cannot be opened by the vehicle ignition key or door key; and, such add-on security enclosures cannot be easily integrated into an on-board vehicle security system which provides an alarm in response to tampering and/or forcible entry.

OBJECTS OF THE INVENTION

It is, therefore, the principal object of the present invention to provide a secure storage unit for mounting onto the open deck of a pickup truck or jeep, for use by engineers, contractors, carpenters, cabinetmakers, electricians, plumbers and other skilled tradesmen who must leave their open deck vehicle unattended.

A related object of the invention is to provide a security compartment for mounting onto the load bed of an open deck vehicle with the security compartment being concealed when the tailgate is closed.

Another object of this invention is to provide a security compartment for an open deck vehicle wherein access to the security compartment and secure closure thereof is provided by the tailgate of the vehicle.

Yet another object of the invention is to provide a security compartment for use on the load bed of an open deck vehicle such as a jeep or pickup truck, with top of the security compartment appearing to form an integral part of the load deck.

Still another object of the invention is to provide a security compartment for use on the load deck of an open deck vehicle which is secured by a locking tailgate of the vehicle, and which can be locked and released by the vehicle tailgate key.

SUMMARY OF THE INVENTION

The foregoing objects are accomplished by a preferred embodiment of the present invention in which the load deck, deck sidewalls and tailgate provide four sides of a security compartment. The top and forward sides of the security compartment are provided by top and forward panels which are secured together along a common edge in an L-shaped configuration, and which are stabilized by side flanges which are adapted for flush engagement against the load deck side panels. The top enclosure panel is recessed below the top edge of the load deck side panels, and has a rear flange adapted for flush engagement against the tailgate. The top panel has a notch formed along the rear edge thereof for receiving the latch housing of the tailgate door when it is closed.

Other objects and advantages of the present invention will be understood by those skilled in the art upon reading the detailed description which follows with reference to the attached drawings, wherein:

DETAILED DESCRIPTION OF THE PREFERRED EMBODIMENT

Figure 1:
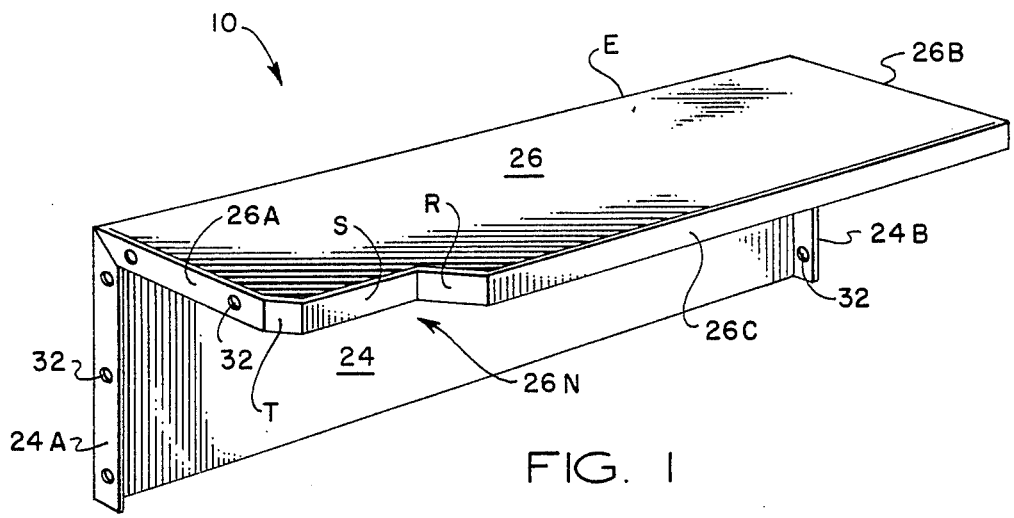
FIG. 1 is a front perspective view of the security enclosure of the present invention.
Figure 2:
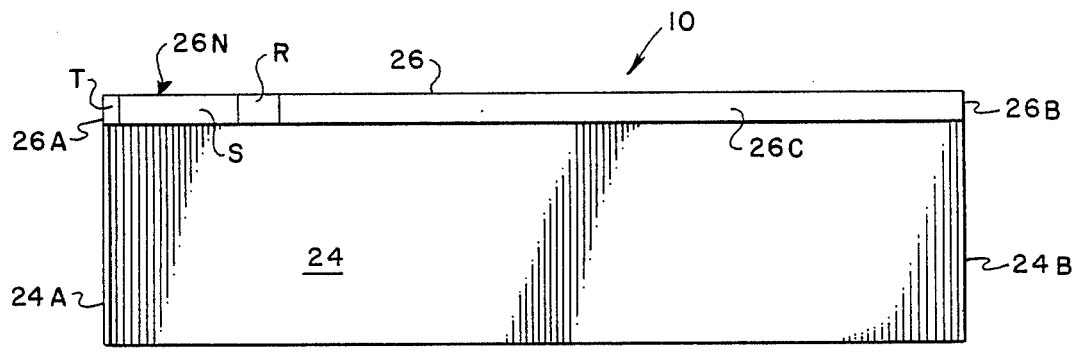
FIG. 2 is a front elevational view thereof.
Figure 3:
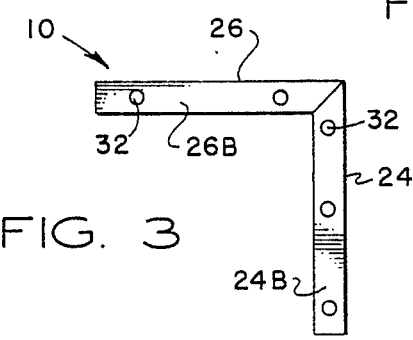
FIG. 3 is a right side elevational view thereof.
Figure 4:
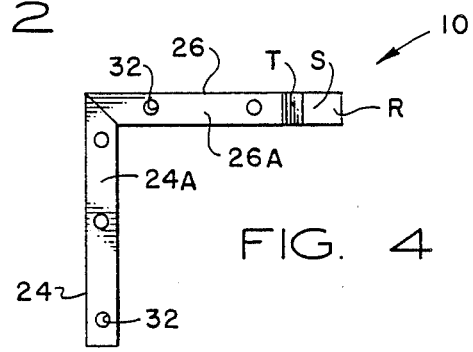
FIG. 4 is a left side elevational view thereof.
Figure 5:
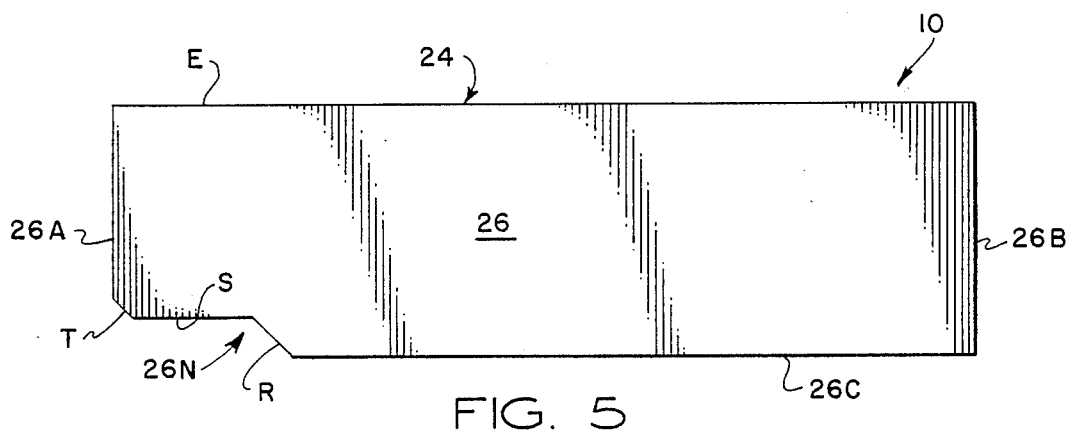
FIG. 5 is a top plan view thereof.
Figure 6:
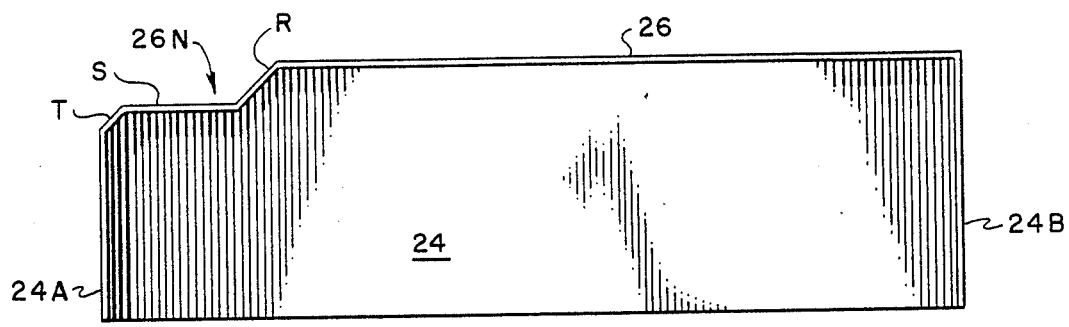
FIG. 6 is a bottom plan view thereof.
Figure 7:
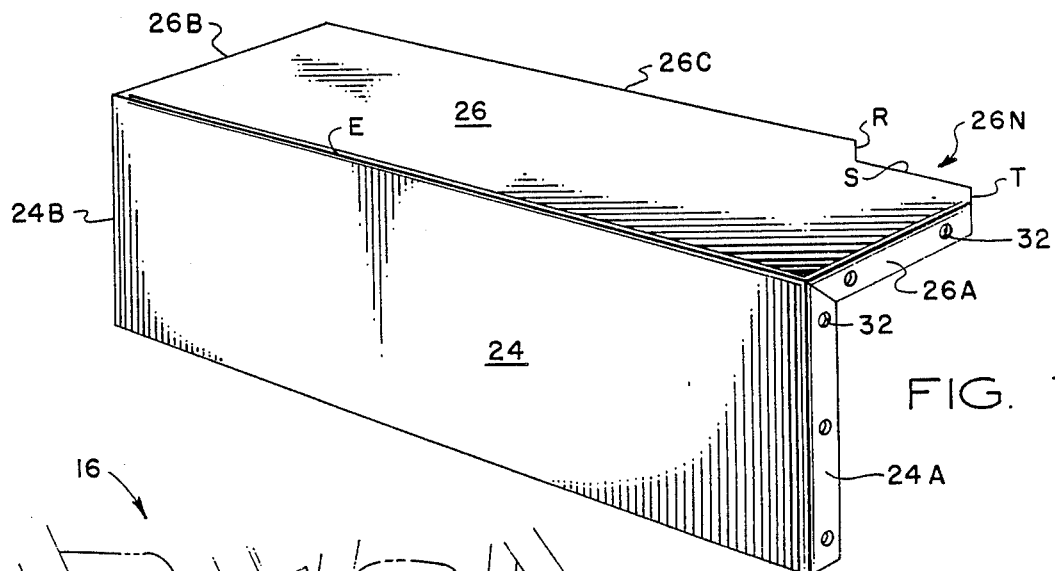
FIG. 7 is a rear perspective view thereof.

In the description which follows, an exemplary embodiment of the invention is described and illustrated in combination with the open deck of a jeep vehicle. It will be understood, however, that the security enclosure of the present invention may be used in combination with any vehicle having an open deck, deck sidewalls and a tailgate.

Like parts are indicated by the same reference numerals throughout the specification and drawings, respectively. The drawings are not necessarily to scale and in some instances, proportions have been exaggerated in order to more clearly depict certain features of the invention.

Figure 8:
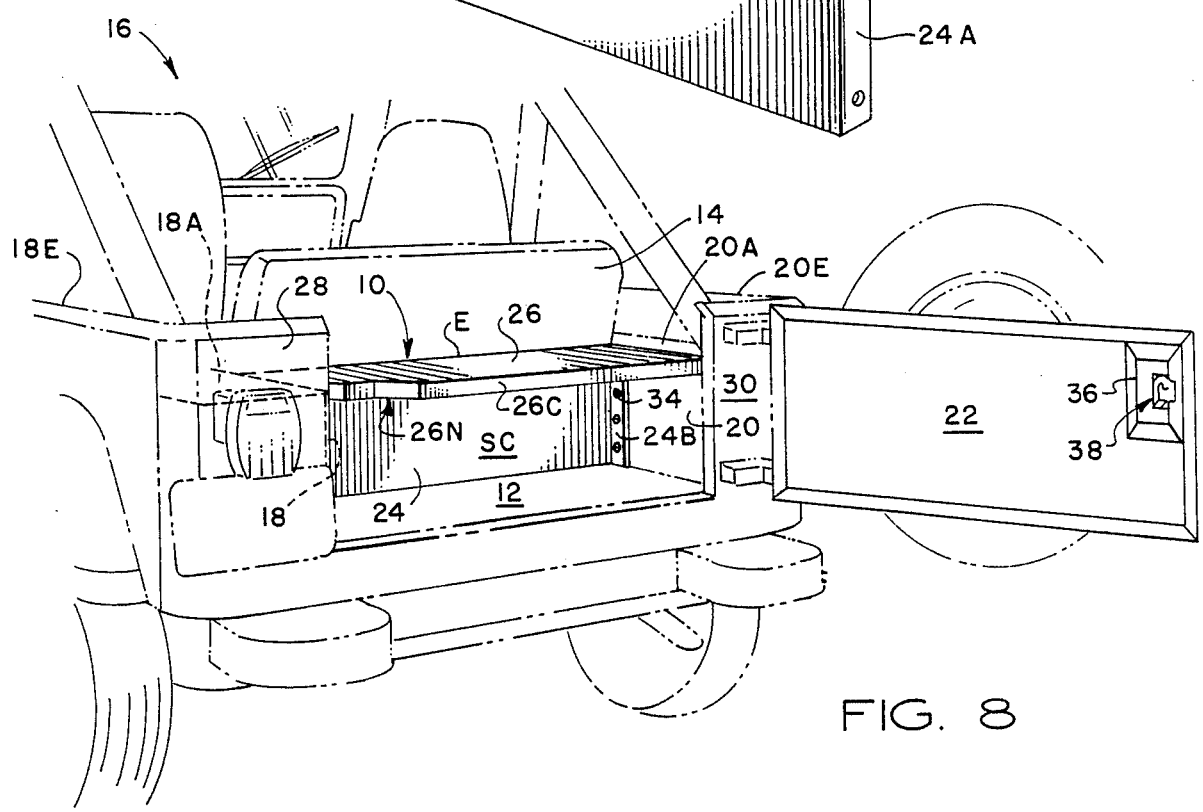
FIG. 8 is a perspective view which illustrates a typical installation of the security enclosure on the open deck of a jeep vehicle.

Referring to FIG. 1 and FIG. 8, a security enclosure 10 is mounted on an open deck 12 which extends immediately behind the rear seat 14 of a jeep vehicle 16. The open deck area behind the rear seat 14 defines a security compartment SC which partially is enclosed by the flat rectangular deck 12, opposite deck sidewalls 18, 20 and a tailgate 22. The tailgate 22 is hinged for horizontal swingable movement relative to the rear end of the load deck 12.

According to the preferred embodiment of the present invention, the forward boundary of the load deck 12 and the security compartment SC is defined by a forward enclosure panel 24, and the top of the security compartment SC is defined by a top enclosure panel 26. Preferably, the panels 24, 26 are constructed of heavy gauge sheet metal, for example No. 16 gauge galvanized steel.

The rear of the security compartment SC is defined in part by left and right tailgate deck panels 28, 30. The space between the left and right tailgate deck panels 28, 30 defines an access opening to the load deck 12 and the security compartment SC.

Referring now to FIGS. 1-7, the forward panel 24 is joined to the top panel 26 along a common edge E in an L-shaped configuration. Preferably, the forward enclosure panel 24 and top enclosure panel 26 extend transversely with respect to each other in right angle relationship.

The forward enclosure panel 24 has a pair of integrally formed side flanges 24A, 24B. Each side flange 24A, 24B extends transversely with respect to the forward enclosure panel 24 in right angle relationship. The width dimension of the forward enclosure panel 24 is selected to provide flush engagement of the side flanges 24A, 24B against the deck sidewall panels 18, 20, respectively.

The top enclosure panel 26 is equipped with integrally formed side flanges 26A, 26B. The side flanges 26A, 26B extend transversely in right angle relationship with the top panel 26. The top panel 26 is also equipped with a rear flange 26C which projects in right angle relationship with the top panel 26.

Each of the transverse flanges 24A, 24B, 26A, 26B have bores 32 formed therein for receiving sheet metal screw fasteners 34 for fastening the security enclosure 10 onto the left and right deck sidewalls 18, 20, respectively.

Referring again to FIG. 8, the security enclosure 10 is mounted onto the deck sidewalls 18, 20 by a plurality of sheet metal screw fasteners 34 which penetrate into the deck sidewalls 18, 20. In the arrangement shown in FIG. 8, the security enclosure 10 is positioned between the rear seat 14 and the left and right tailgate deck panels 28, 30. The external faces of the side flanges 24A, 24B and 26A, 26B are disposed in surface-to-surface engagement against the interior surfaces of the left and right deck sidewalls 18, 20, respectively. Each deck sidewall 18, 20 is inset and recessed below the deck sidewall edges 18E, 20E, respectively.

As shown in FIG. 8, the right deck sidewall 20 is stabilized by a horizontal panel 20A which extends from the right tailgate deck panel 30 to a position forward of the rear seat 14. Preferably, the top panel 26 is disposed in flush engagement with the horizontal panels 18A, 20A. According to this flush mounted arrangement, a deck covering, for example a layer of carpet, can be installed on top of the horizontal panels 18A and on the top panel 26, whereby the security compartment and the top panel 26 are concealed when the tailgate 22 is closed.

The top enclosure panel 26 is rigidly secured onto the left and right deck side panels 18, 20 by sheet metal screw fasteners 34 which are installed through the bore openings 32 formed in the top panel side flanges 26A, 26B.

The top enclosure panel 26 has a notch opening 26N for receiving the latch housing 36 of the tailgate 22 when the tailgate is in the closed position. The tailgate 22 fits within the access opening defined between the left and right tailgate deck panels 28, 30 when the tailgate is in the closed position. Moreover, when the tailgate 22 is closed, the edge flange 26C of the top panel 26 adjoins the tailgate 22 in closely abutting, non-interfering relation. Preferably, the edge flange 26C is disposed in surface contact engagement against the tailgate 22 when the tailgate is closed. According to this arrangement the tailgate 22 mechanically seals the security compartment SC when the tailgate is closed.

The latch housing 36 projects inwardly into the notch 26N in closely conforming, abutting relationship. When the tailgate 22 is closed, the tailgate latch housing 36 is disposed in closely abutting, non-interfering relation with the edge flange segments R, S, T which extend in right angle relationship with the top panel 26.

Because the security enclosure 10 lies below the deck sidewalls, it does not interfere with the attachment of a camper shell, canopy, tunneau cover and the like. When the tailgate is closed the security enclosure is concealed and the top panel 26 appears to be a part of the rear wheel well structure. Moreover, the top panel is positioned in flush alignment with the horizontal wheel well panels, thereby providing auxiliary deck storage immediately behind the rear seat and above the top panel and wheel well panels.

Because the side edge flanges are securely fastened by sheet metal screws 34 to the left and right deck side panels, access to the security compartment SC can be gained only by first opening the tailgate 22. The tailgate 22 has a lock assembly 38 which can be locked and released by a tailgate key. Accordingly, the compartment SC is secured and locked when the tailgate is closed and locked. Portable personal property such as mobile telephone equipment, briefcases, portable radios, tape decks and the like can be safely stored within the security compartment SC when it is necessary to leave the vehicle unattended. Moreover, if the vehicle is equipped with an electronic security alarm which monitors the tailgate lock, the security compartment SC will be further protected by the on-board vehicle security system since the security enclosure 10 does not interfere with operation of the tailgate door 22 or the lock assembly 38.

In contrast with prior art arrangements, the security enclosure 10 does not interfere with the use of portable coverings such as camper shells and canopies. Moreover, the security enclosure imposes only a slight reduction in the use of the load bed of pickup trucks for cargo handling, and can be snugly fitted between the rear seat and tailgate of an open deck jeep. Moreover, because of the recessed fit of the security compartment against the load deck sidewalls and the rear tailgate, the top panel of the security compartment appears to be an integral part of the load deck and load deck sidewalls. Because the security compartment paneling is fastened internally to the load deck sidewall, access to the security compartment can be gained only through the tailgate, and personal property may be safely secured within the security compartment merely by locking the tailgate.

A preferred embodiment of the invention has been described in detail. Since changes and modifications to the above preferred embodiment may be made without departing from the spirit of the invention, the scope of the invention is not limited to the foregoing details, except as set forth in the appended claims.

What is claimed is:

1. A security enclosure for mounting onto the load bed of an open deck vehicle of the type having a load deck, deck sidewalls and a tailgate, with the deck sidewalls and the tailgate providing four sides of a security compartment, comprising, in combination:

top and forward side panels joined together along a common edge in an L-shaped configuration, said top and forward side panels each having side flanges extending transversely with respect to said forward and top panels for flush engagement against the deck sidewalls, said top panel having a notch opening for receiving the latch housing of the tailgate when the tailgate is in the closed position; and, fastener apparatus for securing the side flanges to said deck sidewalls.

2. In combination with an open deck vehicle of the type having a load deck, deck sidewalls and a tailgate at one end thereof, the improvement comprising top and forward enclosure panels joined together along a common edge in an L-shaped configuration, said top and forward enclosure panels each having side flanges extending transversely with respect to said forward and top enclosure panels and adapted for flush engagement against said deck sidewalls, said load deck, deck sidewalls and tailgate defining four sides of said security enclosure, said security enclosure being sealed when said tailgate is closed and being accessible when said tailgate is open; and, fastener apparatus for securing the side flanges to said deck sidewalls.

* * * * *